US011447623B2

(12) United States Patent
Wang et al.

(10) Patent No.: US 11,447,623 B2
(45) Date of Patent: Sep. 20, 2022

(54) PROCESS FOR PREPARING A POLYPROPYLENE COMPOSITION

(71) Applicant: BOREALIS AG, Vienna (AT)

(72) Inventors: Jingbo Wang, Linz (AT); Markus Gahleitner, Linz (AT); Elisabeth Potter, Linz (AT); Jani Aho, Porvoo (FI); Klaus Bernreitner, Linz (AT); Luc Monnissen, Arsimont (BE); Meta Cigon, Vienna (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 16/626,083

(22) PCT Filed: Jun. 27, 2018

(86) PCT No.: PCT/EP2018/067201
§ 371 (c)(1),
(2) Date: Dec. 23, 2019

(87) PCT Pub. No.: WO2019/002346
PCT Pub. Date: Jan. 3, 2019

(65) Prior Publication Data
US 2020/0207963 A1 Jul. 2, 2020

(30) Foreign Application Priority Data
Jun. 29, 2017 (EP) ..................... 17178776

(51) Int. Cl.
*C08F 2/00* (2006.01)
*C08F 210/06* (2006.01)
*C08F 4/654* (2006.01)
*C08L 23/14* (2006.01)
*C08F 10/06* (2006.01)

(52) U.S. Cl.
CPC ............. *C08L 23/14* (2013.01); *C08F 10/06* (2013.01); *C08L 2205/025* (2013.01); *C08L 2205/03* (2013.01); *C08L 2314/02* (2013.01)

(58) Field of Classification Search
CPC ............. C08L 23/14; C08L 2205/025; C08L 2205/03; C08L 2314/02
See application file for complete search history.

(56) References Cited
U.S. PATENT DOCUMENTS

| | | | |
|---|---|---|---|
| 6,005,034 A | 12/1999 | Hayashida et al. | |
| 8,389,654 B2 * | 3/2013 | Alastalo | C08L 23/12 526/65 |
| 2014/0005337 A1 | 1/2014 | Hallot et al. | |
| 2015/0240063 A1 | 8/2015 | Vion | |
| 2016/0208032 A1 | 7/2016 | Vestberg et al. | |
| 2016/0311950 A1 | 10/2016 | Batinas-geurts et al. | |
| 2016/0312018 A1 | 10/2016 | Vestberg et al. | |
| 2016/0347944 A1 | 12/2016 | Wang et al. | |
| 2017/0051125 A1 | 2/2017 | Gloger et al. | |

FOREIGN PATENT DOCUMENTS

| | | |
|---|---|---|
| CN | 105722877 A | 6/2016 |
| EP | 339804 | 3/1989 |
| EP | 860457 | 2/1998 |
| EP | 0887379 | 6/1998 |
| EP | 2022824 A1 | 2/2009 |
| EP | 2257594 | 3/2009 |
| EP | 2182030 A1 | 5/2010 |
| EP | 2539398 | 2/2011 |
| EP | 2338657 A1 | 6/2011 |
| EP | 2610271 B1 | 12/2011 |
| EP | 2610272 | 12/2011 |
| EP | 2686382 | 3/2012 |
| EP | 2594593 A1 | 5/2013 |
| EP | 3015504 A1 | 5/2016 |
| EP | 3064514 A1 | 9/2016 |
| EP | 2174980 B2 | 10/2018 |
| WO | 1992012128 | 1/1992 |
| WO | 9212182 A1 | 7/1992 |
| WO | 1999024478 | 5/1999 |
| WO | 1999024479 | 5/1999 |
| WO | 2000068315 | 11/2000 |
| WO | 2004000899 | 12/2003 |
| WO | 2004111095 | 12/2004 |
| WO | 2009129873 A1 | 10/2009 |
| WO | 2012007430 | 1/2012 |
| WO | 2012126759 A1 | 9/2012 |
| WO | 2014154610 | 3/2014 |
| WO | 2014187687 | 11/2014 |
| WO | 2014202432 A1 | 12/2014 |
| WO | 2015091981 A2 | 6/2015 |
| WO | 2015150467 A1 | 10/2015 |
| WO | WO2015197434 A1 * | 12/2015 |
| WO | 2016116606 A1 | 7/2016 |
| WO | 2016135107 A1 | 9/2016 |
| WO | 2016135108 | 9/2016 |

OTHER PUBLICATIONS

International Search Report and Written Opinion issued for Application No. PCT/EP2018/084315, dated Jan. 17, 2019, 15 pages.
International Search Report and Written Opinion in PCT/EP2018/067201, dated Sep. 28, 2018. 11 pages.
Singh et al. Triad sequence determination of ethylene-propylene copolymers—application of quantitative 130 NMR. Polymer Testing, 2009, 28, 475-479.
Zhou et al. A new decoupling method for accurate quantification of polyethylene copolymer composition and triad sequence distribution with 13C NMR. Journal of Magnetic Resonance, 2007, 187, 225-233.
Busico et al. Alk-1-ene polymerization in the presnence of a monocyclopentadienyl zirconium(IV) acetamidinate catalyst: microstructural and mechanistic insights. Macromolecular Rapid Communications. 2007, 28, 1128-1134.
Cheng. 13C NMR Analysis of Ethylene-Propylene Rubbers. Macromolecules, 1984, 17, 1950-1955.

(Continued)

Primary Examiner — Irina S Zemel
Assistant Examiner — Jeffrey S Lenihan
(74) Attorney, Agent, or Firm — Meunier Carlin & Curfman LLC

(57) ABSTRACT

The invention relates to a process for producing a polypropylene composition by sequential polymerization the polypropylene composition having an improved balanced combination of high flowability, high stiffness and impact, and high level of optical properties.

13 Claims, No Drawings

(56) References Cited

OTHER PUBLICATIONS

Wang et al. Structural analysis of ethylene/propylene copolymers synthesized with a constrained geometry catalyst. Macromolecules, 2000, 33, 1157-1162.
International Search Report and Written Opinion in PCT/EP2018/067200, dated Oct. 1, 2018. 15 pages.
Wang Zhengyou et al. "Effect of α Nucleating Agent on Crystallization, Light Transmittance Rate and Mechanical Property of Polypropylene", Plastics Science and Technology, vol. 39, No. 2, pp. 90-93, Feb. 2011.

* cited by examiner

PROCESS FOR PREPARING A POLYPROPYLENE COMPOSITION

The present invention relates to a process for producing a polypropylene composition by sequential polymerization. More specifically, the invention relates to a process for producing a polypropylene composition comprising propylene and one or more comonomers selected from ethylene and $C_4$-$C_{10}$ alpha-olefins and to the polypropylene composition obtained by said process. The invention further relates to an article comprising the polypropylene composition.

Propylene homopolymers and copolymers are suitable for many applications such as packaging, textile, automotive and pipe. An important area of application of propylene homopolymers and copolymers is the packaging industry, particularly in film and moulding applications.

In the field of packaging it is of great importance to have a good flowing polypropylene composition with good mechanical properties, i.e. a high tensile modulus and good impact strength. The good flowability is needed for achieving a good processability in various manufacturing processes of articles, like for example in injection moulding processes, thereby allowing a high production speed, which is generally required in mass production market. Mechanical properties are also important in this type of applications, particularly in the field of containers, where it is needed to hold the content, such as food or fluid, contained therein. Additionally, there is the need to have sufficient stiffness for the container to be stacked.

Additionally, the polypropylene composition should also withstand mechanical compression damage, which is frequently incurred by e.g. dropping the articles.

Still further, also the haze should be acceptable. Particularly, a good balance between stiffness and haze is needed.

However, at least some of these properties may only be achieved at the expense of other of these properties. For instance, with increase of melt flow rate the stiffness can be improved, while the impact properties significantly drop. Thus, impact strength and melt flow rate of the polypropylene composition behave in a conflicting manner.

Further, a high degree of crystallinity of the polypropylene composition renders it rather stiff, however it also increases its haze. Thus, the balance of stiffness and haze in the polypropylene composition is of great importance.

Thus, there is a general need of a process for the manufacture of a polypropylene composition which is featured by a balanced combination of high flowability, high stiffness and impact, and high level of optical properties (low haze value).

EP2539398 discloses a process for the preparation of a random propylene copolymer in a sequential polymerization process, wherein said process comprises the steps of
a) polymerizing propylene and at least one ethylene and/or a $C_4$ to $C_{20}$ α-olefin in a first reactor (R1) obtaining the a polypropylene (PP1) being the a random propylene copolymer (R-PP1), said polypropylene (PP1) has a melt flow rate $MFR_{10}$ (230 C) measured according to ISO 1133 of not more than 1.5 g/10 min,
b) transferring the first polypropylene (PP1) in a second reactor (R2)
c) polymerizing in the second reactor (R2) and in the presence of said first polypropylene (PP1) propylene and optionally at least one ethylene and/or a $C_4$ to $C_{20}$ α-olefin obtaining thereby a second polypropylene (PP2), said first polypropylene (PP1) and said second polypropylene (PP2) form a (intimate) mixture and said second polypropylene (PP2) being a first propylene homopolymer (H-PP1) or a second random propylene copolymer (R-PP2),
d) transferring the mixture of the first polypropylene (PP1) and the second polypropylene (PP2) in a third reactor (R3), and
e) polymerizing in the third reactor (R3) and in the presence of the mixture of the first polypropylene (PP1) and the second polypropylene (PP2) propylene and optionally at least one ethylene and/or a $C_4$ to $C_{20}$ α-olefin obtaining thereby a third polypropylene (PP3), said third polypropylene (PP3) being a second propylene homopolymer (H-PP2) or a third random propylene copolymer (R-PP3) and the first polypropylene (PP1), the second polypropylene (PP2) and the third polypropylene (PP3) form a (intimate) mixture.

However, the invention in EP2539398 is directed to pipes, thus, $MFR_2$ of the resulting random propylene copolymer is between 0.5 to 10.0 g/10 min and may comprise in particular beta-nucleating agents. Additionally, EP2539398 is silent about haze properties of the resulting random propylene copolymer.

The present invention is based on the finding that the above discussed needs for a balanced combination of high flowability, high stiffness and impact, and high level of optical properties (low haze value) can be achieved by a process for producing a specific polypropylene composition. Thus, the present invention provides a process for producing a polypropylene composition by sequential polymerization comprising the steps:
a) polymerizing in a first reactor, preferably a slurry reactor, monomers comprising propylene and optionally one or more comonomers selected from ethylene and $C_4$-$C_{10}$ alpha-olefins, to obtain a first propylene polymer fraction having a comonomer content in the range of 0.0 to 1.0 wt %,
b) polymerizing in a second reactor, preferably a first gas-phase reactor, monomers comprising propylene and one or more comonomers selected from ethylene and $C_4$-$C_{10}$ alpha-olefins, in the presence of the first propylene polymer fraction, to obtain a second propylene polymer fraction having a comonomer content in the range of 0.3 to 2.0 wt %,
c) polymerizing in a third reactor, preferably a second gas-phase reactor, monomers comprising propylene and one or more comonomers selected from ethylene and $C_4$-$C_{10}$ alpha-olefins, in the presence of the second propylene polymer fraction to obtain a third propylene polymer fraction having a comonomer content in the range of from 1.5 to 5.0 wt %,
d) extruding the third propylene polymer fraction in the presence of at least one alpha-nucleating agent,
wherein the polypropylene composition has an $MFR_2$ in the range of from 12.0 to 60.0 g/10 min, as measured according to ISO 1133 at 230° C. under a load of 2.16 kg.

The first, second and third propylene polymer fractions, according to the present invention, are produced in a sequential polymerization process. The term "sequential polymerization process", in the present application, indicates that the propylene polymer fractions are produced in a process comprising at least three reactors connected in series. In one preferred embodiment the term "sequential polymerization process" indicates, in the present application, that the reaction mixture of the first reactor, i.e. the first propylene polymer fraction with unreacted monomers, is conveyed, preferably directly conveyed; into a second reactor where a second propylene polymer fraction is obtained. The reaction mixture of the second reactor, i.e. the second propylene polymer fraction with unreacted monomers, is conveyed, preferably directly conveyed; into a third reactor where a third propylene polymer fraction is obtained.

Accordingly, in the process according to the invention:
i— the first propylene polymer fraction obtained in the first reactor generally comprises a first propylene polymer which is produced in said first reactor,
ii— the second propylene polymer fraction obtained in the second reactor generally comprises a second propylene polymer which is produced in said second reactor,
iii— the third propylene polymer fraction obtained in the third reactor generally comprises a third propylene polymer which is produced in said third reactor.

Accordingly, the present process comprises at least a first reactor, a second reactor and a third reactor. The process may comprise at least one additional polymerization reactor subsequent to the third reactor. In one specific embodiment the process according to the invention consists of three polymerization reactors i.e. a first reactor, a second reactor and a third reactor. The term "polymerization reactor" shall indicate that the main polymerization takes place. Thus, in case the process consists of three or more polymerization reactors, this definition does not exclude the option that the overall process comprises for instance a pre-polymerization step in a pre-polymerization reactor. The term "consists of" is only a closing formulation in view of the main polymerization reactors. In case the overall process according to the invention comprises a pre-polymerization reactor, the term "first propylene polymer fraction" means the sum of (co)polymer produced in the pre-polymerization reactor and the (co)polymer produced in the first reactor.

The reactors are generally selected from slurry and gas phase reactors.

The first reactor is preferably a slurry reactor and can be any continuous or simple stirred batch tank reactor or loop reactor operating in bulk polymerization or slurry polymerization. By "bulk polymerization" it is meant a process where the polymerization is conducted in a liquid monomer essentially in the absence of an inert diluent. However, it is known to a person skilled in the art, that the monomers used in commercial production are never pure but always contain aliphatic hydrocarbons as impurities. For instance, the propylene monomer may contain up to 5% of propane as an impurity. Thus, "bulk polymerization" preferably means a polymerization in a reaction medium that comprises at least 60% (wt/wt) of the monomer. According to the present invention, the first reactor is more preferably a loop reactor.

The second reactor is preferably a first gas-phase reactor. Said first gas-phase reactor can be any mechanically mixed or fluidized bed reactor or settled bed reactor. Preferably, the first gas-phase reactor comprises a mechanically agitated fluidized bed reactor with gas velocities of at least 0.2 m/sec. The first gas-phase reactor of a fluidized bed type reactor can further include a mechanical agitator to facilitate the mixing within the fluidized bed.

The third reactor is preferably a second gas-phase reactor. Said second gas-phase reactor can be any mechanically mixed or fluidized bed reactor or settled bed reactor. Preferably the second gas-phase reactor comprises a mechanically agitated fluidized bed reactor with gas velocities of at least 0.2 m/sec. The second gas-phase reactor of a fluidized bed type reactor can further include a mechanical agitator to facilitate the mixing within the fluidized bed.

The potentially subsequent polymerization reactor or reactors is/are preferably a gas-phase reactor.

A preferred polymerization process is a "loop-gas phase"-process, such as developed by Borealis and known as BORSTAR™ technology. Examples of this polymerization process are described in EP0887379, WO92/12182, WO2004/000899, WO2004/111095, WO99/24478, WO99/24479 and WO00/68315.

When the overall process according to the invention comprises a pre-polymerization reactor, said pre-polymerization step takes place prior to the polymerization in the first reactor. The pre-polymerization step takes place in a pre-polymerization reactor wherein pre-(co)polymerization of propylene is conducted. The pre-polymerization reactor is of smaller size compared to the first reactor, the second reactor, the third reactor and the subsequent polymerization reactor or reactors, according to the invention, respectively. The reaction volume of the pre-polymerization reactor can be, for example, between 0.001% and 10% of the reaction volume of the first reactor, like the loop reactor. In said pre-polymerization reactor, the pre-(co)polymerization of propylene is performed in bulk or slurry, producing a propylene (co)polymer.

The operating temperature in the pre-polymerization reactor is in the range of 0 to 60° C., preferably in the range of 15 to 50° C., more preferably in the range of 18 to 35° C.

The pressure in the pre-polymerization reactor is not critical but must be sufficiently high to maintain the reaction mixture in liquid phase. Thus, the pressure in the pre-polymerization reactor may be in the range of 20 to 100 bar, preferably in the range of 30 to 70 bar.

Hydrogen can be added in the pre-polymerization reactor in order to control the molecular weight, and thus the melt flow rate $MFR_2$ of the propylene (co)polymer produced in the pre-polymerization reactor.

In the first reactor of the process according to the invention, a monomer feed comprised of propylene and optionally one or more comonomers selected from ethylene and $C_4$-$C_{10}$ alpha-olefins is fed. In case the pre-polymerization step is present in the process, the propylene (co)polymer produced in the pre-polymerization reactor, is also fed into the first reactor. In the first reactor, a first propylene polymer fraction is obtained.

The first propylene polymer fraction generally has a comonomer content selected from ethylene and $C_4$-$C_{10}$ alpha-olefins in the range of from 0.0 to 1.0 wt %, preferably in the range of from 0.0 to 0.8 wt %, more preferably in the range of from 0.0 to 0.7 wt %, relative to the total amount of monomers present in the first propylene polymer fraction.

Generally, the first propylene polymer fraction has a melt flow rate ($MFR_2$) in the range of from 11 to 60 g/10 min, preferably in the range of from 15 to 40 g/10 min, more preferably in the range of from 17 to 35 g/10 min. The $MFR_2$ is determined according to ISO 1133, at a temperature of 230° C. and under a load of 2.16 kg.

The operating temperature in the first reactor is generally in the range of 62 to 85° C., preferably in the range of 65 to 82° C., more preferably in the range of 67 to 80° C.

Typically the pressure in the first reactor is in the range of 20 to 80 bar, preferably in the range of 30 to 70 bar, more preferably in the range of 35 to 65 bar.

Hydrogen can be added in the first reactor in order to control the molecular weight, and thus the melt flow rate $MFR_2$ of the first propylene polymer fraction obtained in said first reactor.

Generally, the hydrogen/propylene ($H_2/C_3$) ratio in the first reactor is in the range of 1.5 to 6.0 mol/kmol, preferably in the range of from 1.6 to 5.5 mol/kmol, more preferably in the range of from 1.7 to 5.0 mol/kmol.

Generally, the ratio of one or more comonomers (selected from ethylene and $C_4$-$C_{10}$ alpha-olefins) to $C_3$ in the first reactor is below 10.0 mol/kmol, preferably in the range of from 0.0 to 8.0 mol/kmol, more preferably in the range of from 0.0 to 7.5 mol/kmol.

Generally, the reaction mixture of the first reactor is conveyed, preferably directly conveyed; into the second reactor. By "directly conveyed" is meant a process wherein the reaction mixture of the first reactor is led directly to the next polymerization step, i.e. the second reactor. Monomers comprising propylene and one or more comonomers selected from ethylene and $C_4$-$C_{10}$ alpha-olefins are fed into the second reactor. In the second reactor, a second propylene polymer fraction is obtained.

The second propylene polymer fraction generally has a comonomer content selected from ethylene and $C_4$-$C_{10}$ alpha-olefins in the range of from 0.3 to 2.0 wt %, preferably in the range of from 0.5 to 1.7 wt %, more preferably in the range of from 0.6 to 1.5 wt %, relative to the total amount of monomers present in the second propylene polymer fraction.

Generally, the second propylene polymer fraction has a melt flow rate ($MFR_2$) in the range of from 11 to 60 g/10 min, preferably in the range of from 15 to 40 g/10 min, more preferably in the range of from 17 to 35 g/10 min. The $MFR_2$ is determined according to ISO 1133, at a temperature of 230° C. and under a load of 2.16 kg.

The operating temperature in the second reactor is generally in the range of 70 to 95° C., preferably in the range of 75 to 90° C., more preferably in the range of 78 to 88° C.

Typically the pressure in the second reactor is in the range of 5 to 50 bar, preferably in the range of 15 to 40 bar.

Hydrogen can be added in the second reactor in order to control the molecular weight, and thus the melt flow rate $MFR_2$ of the second propylene polymer fraction obtained in said second reactor.

Generally, the hydrogen/propylene ($H_2$/$C_3$) ratio in the second reactor is in the range of 12.0 to 70.0 mol/kmol, preferably in the range of 15.0 to 60.0 mol/kmol, more preferably in the range of 16.0 to 50.0 mol/kmol.

Generally, the ratio of one or more comonomers (selected from ethylene and $C_4$-$C_{10}$ alpha-olefins) to $C_3$ in the second reactor is in the range of 4.5 to 20.0 mol/kmol, preferably in the range of 5.0 to 18.0 mol/kmol, more preferably in the range of 5.5 to 17.0 mol/kmol.

Generally, the reaction mixture of the second reactor is conveyed, preferably directly conveyed; into the third reactor. By "directly conveyed" is meant a process wherein the reaction mixture of the second reactor is led directly to the next polymerization step, i.e. the third reactor. Monomers comprising propylene and one or more comonomers selected from ethylene and $C_4$-$C_{10}$ alpha-olefins are fed into the third reactor. In the third reactor, a third propylene polymer fraction is obtained.

The third propylene copolymer fraction generally has a comonomer content selected from ethylene and $C_4$-$C_{10}$ alpha-olefins in the range of from 1.5 to 5.0 wt %, preferably in the range of from 1.6 to 4.0 wt %, more preferably in the range of from 1.7 to 3.5 wt %, relative to the total amount of monomers present in the third propylene polymer fraction.

Generally, the third propylene polymer fraction has a melt flow rate ($MFR_2$) in the range of from 12 to 60 g/10 min, preferably in the range of from 15 to 40 g/10 min, more preferably in the range of from 17 to 35 g/10 min. The $MFR_2$ is determined according to ISO 1133, at a temperature of 230° C. and under a load of 2.16 kg.

The operating temperature in the third reactor is generally in the range of 70 to 95° C., preferably in the range of 75 to 90° C., more preferably in the range of 78 to 88° C.

Typically, the pressure in the third reactor is in the range of 5 to 50 bar, preferably in the range of 15 to 40 bar.

Hydrogen can be added in the third reactor in order to control the molecular weight, and thus the melt flow rate $MFR_2$ of the third propylene polymer fraction obtained in said third reactor.

Generally the hydrogen/propylene ($H_2$/$C_3$) ratio in the third reactor is in the range of 15.0 to 80.0 mol/kmol, preferably in the range of 17.0 to 70.0 mol/kmol, more preferably in the range of 19.0 to 60.0 mol/kmol.

Generally the ratio of one or more comonomers (selected from ethylene and $C_4$-$C_{10}$ alpha-olefins) to $C_3$ in the third reactor is in the range of 45.0 to 200.0 mol/kmol, preferably in the range of 50.0 to 180.0 mol/kmol, more preferably in the range of 55.0 to 170.0 mol/kmol.

In the process according to the invention, the propylene polymer produced in the first reactor i.e. the first propylene polymer is generally produced in an amount in the range of from 8 to 55 wt %, preferably in an amount in the range of from 9 to 52 wt %, more preferably in an amount in the range of from 10 to 50 wt %.

In the process according to the invention, the propylene polymer produced in the second reactor i.e. the second propylene polymer is generally produced in an amount in the range of from 30 to 86 wt %, preferably in an amount in the range of from 35 to 80 wt %, more preferably in an amount in the range of from 38 to 78 wt %.

In the process according to the invention, the propylene polymer produced in the third reactor i.e. the third propylene polymer is generally produced in an amount in the range of from 6 to 30 wt %, preferably in an amount in the range of from 7 to 28 wt %, more preferably in an amount in the range of from 8 to 27 wt %. The amount of the first propylene polymer, the second propylene polymer and the third propylene polymer is relative to the total sum of first propylene polymer, second propylene polymer and third propylene polymer comprised in the third propylene polymer fraction.

In a preferred embodiment, the one or more comonomers selected from ethylene and $C_4$-$C_{10}$ alpha-olefins are incorporated into the reactors of the inventive process in different amounts resulting in a third propylene polymer fraction having trimodal comonomer distribution with respect to the comonomer content of each of the propylene polymers comprised in said third propylene polymer fraction, i.e. first propylene polymer, second propylene polymer and third propylene polymer.

In the process according to the invention, the one or more comonomers are selected from ethylene and $C_4$-$C_{10}$ alpha-olefins, preferably selected from ethylene and $C_4$-$C_8$ alpha-olefins, more preferably selected from ethylene and $C_4$-$C_6$ alpha-olefins, even more preferably selected from one or more comonomers comprising ethylene, further even more preferably the comonomer is selected from solely ethylene, through the present invention.

After the polymerization in the third reactor step, the third propylene polymer fraction obtained in the third reactor is recovered by conventional procedures know by the person skilled in the art. The recovered third propylene polymer fraction according to the invention is generally in the form of particles.

Generally, a polymerization catalyst is present in the process according to the invention. The polymerization catalyst is preferably a Ziegler-Natta catalyst. Generally, the polymerization Ziegler-Natta catalyst comprises one or more compounds of a transition metal (TM) of Group 4 to 6 as defined in IUPAC version 2013, like titanium, further a Group 2 metal compound, like a magnesium compound and an internal donor (ID).

The components of the catalyst may be supported on a particulate support, such as for example an inorganic oxide, like for example silica or alumina. Alternatively, a magnesium halide may form the solid support. It is also possible that the catalyst components are not supported on an external support, but the catalyst is prepared by an emulsion-solidification method or by a precipitation method, as is well-known by the man skilled in the art of catalyst preparation.

Preferably, a specific type of Ziegler-Natta catalyst is present in the process according to the invention. In this specific type of Ziegler-Natta catalyst, it is essential that the internal donor is a non-phthalic compound. Preferably, through the whole specific type of Ziegler-Natta catalyst preparation no phthalate compound is used, thus the final specific type of Ziegler-Natta catalyst does not contain any phthalic compound. Thus, the specific type of Ziegler-Natta catalyst is free of phthalic compound. Therefore, the third propylene polymer fraction obtained in the third reactor of the process according to the invention is free of phthalic compound.

Generally, the specific type of Ziegler-Natta catalyst comprises an internal donor (ID) which is chosen to be a non-phthalic compound, in this way the specific type of Ziegler-Natta catalyst is completely free of phthalic compound. Further, the specific type of Ziegler-Natta catalyst can be a solid catalyst preferably being free of any external support material, like silica or $MgCl_2$, and thus the solid catalyst is self-supported.

The solid catalyst is obtainable by the following general procedure:
a) providing a solution of
   $a_1$) at least a Group 2 metal alkoxy compound (Ax) being the reaction product of a Group 2 metal compound and an alcohol (A) comprising in addition to the hydroxyl moiety at least one ether moiety, optionally in an organic liquid reaction medium; or
   $a_2$) at least a Group 2 metal alkoxy compound (Ax') being the reaction product of a Group 2 metal compound and an alcohol mixture of the alcohol (A) and a monohydric alcohol (B) of formula ROH, optionally in an organic liquid reaction medium; or
   $a_3$) a mixture of the Group 2 metal alkoxy compound (Ax) and a Group 2 metal alkoxy compound (Bx) being the reaction product of a Group 2 metal compound and the monohydric alcohol (B), optionally in an organic liquid reaction medium; or
   $a_4$) Group 2 metal alkoxy compound of formula $M(OR_1)_n(OR_2)_m X_{2-n-m}$ or mixture of Group 2 alkoxides $M(OR_1)_n X_{2-n}$ and $M(OR_2)_m X_{2-m}$, where M is a Group 2 metal, X is halogen, R1 and R2 are different alkyl groups of 2 to 16 carbon atoms, and $0 \leq n < 2$, $0 \leq m < 2$ and $n+m+(2-n-m)=2$, provided that n and m are not 0 simultaneously, $0 < n' \leq 2$ and $0 < m' \leq 2$; and
b) adding said solution from step a) to at least one compound of a transition metal of Group 4 to 6 and
c) obtaining the solid catalyst component particles, and adding a non-phthalic internal electron donor (ID) at least in one step prior to step c).

The internal donor (ID) or precursor thereof is preferably added to the solution of step a) or to the transition metal compound before adding the solution of step a).

According to the procedure above, the solid catalyst can be obtained via a precipitation method or via an emulsion—solidification method depending on the physical conditions, especially the temperature used in steps b) and c). An emulsion is also called liquid-liquid two-phase system. In both methods (precipitation or emulsion-solidification) the catalyst chemistry is the same.

In the precipitation method, combination of the solution of step a) with at least one transition metal compound in step b) is carried out and the whole reaction mixture is kept at least at 50° C., more preferably in a temperature range of 55 to 110° C., more preferably in a range of 70 to 100° C., to secure full precipitation of the catalyst component in the form of solid catalyst component particles (step c).

In the emulsion-solidification method, in step b) the solution of step a) is typically added to the at least one transition metal compound at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C. The catalyst prepared by the emulsion-solidification method is preferably used in the present invention.

In step a) preferably the solution of $a_2$) or $a_3$) is used, i.e. a solution of (Ax') or a solution of a mixture of (Ax) and (Bx).

Preferably, the Group 2 metal is magnesium. The magnesium alkoxy compounds (Ax), (Ax'), (Bx) can be prepared in situ in the first step of the catalyst preparation process, step a), by reacting the magnesium compound with the alcohol(s) as described above. Another option is to prepare said magnesium alkoxy compounds separately or they can be even commercially available as already prepared magnesium alkoxy compounds and used as such in the catalyst preparation process of the invention.

Illustrative examples of alcohols (A) are glycol monoethers. Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy) ethanol, 2-butyloxy ethanol, 2-hexyloxy ethanol and 1,3-propylene-glycol-monobutyl ether, 3-butoxy-2-propanol, with 2-(2-ethylhexyloxy) ethanol and 1,3-propylene-glycol-monobutyl ether, 3-butoxy-2-propanol being particularly preferred.

The illustrative monohydric alcohol (B) is represented by the structural formula ROH with R being a straight-chain or branched $C_2$-$C_{16}$ alkyl residue, preferably a $C_4$ to $C_{10}$ alkyl residue, more preferably a $C_6$ to $C_8$ alkyl residue. The most preferred monohydric alcohol is 2-ethyl-1-hexanol or octanol.

Preferably, a mixture of Mg alkoxy compounds (Ax) and (Bx) or a mixture of alcohols (A) and (B), respectively, are used and employed in a mole ratio of Bx:Ax or B:A from 10:1 to 1:10, more preferably 6:1 to 1:6, still more preferably 5:1 to 1:3, most preferably 5:1 to 3:1.

The magnesium alkoxy compound may be a reaction product of alcohol(s), as defined above and a magnesium compound selected from dialkyl magnesium, alkyl magnesium alkoxide, magnesium dialkoxide, alkoxy magnesium halide and alkyl magnesium halide. Further, magnesium dialkoxide, magnesium diaryloxide, magnesium aryloxyhalide, magnesium aryloxide and magnesium alkyl aryloxide can be used. Alkyl groups in the magnesium compound can be similar or different $C_1$-$C_{20}$ alkyl groups, preferably $C_2$-$C_{10}$ alkyl groups. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred, dialkyl magnesiums are butyl octyl magnesium or butyl ethyl magnesium.

It is also possible that the magnesium compound reacts in addition to the alcohol (A) and alcohol (B) with a polyhydric alcohol (C) of formula $R''(OH)_m$ to obtain said magnesium alkoxide compound. Preferred polyhydric alcohols, if used, are alcohols, wherein R" is a straight-chain, cyclic or branched $C_2$ to $C_{10}$ hydrocarbon residue and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides or a mixture of magnesium dihalide and a magnesium dialkoxide.

The solvent to be employed for the preparation of the present catalyst may be selected from among aromatic and aliphatic straight-chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particularly preferred.

The reaction for the preparation of the magnesium alkoxy compound may be carried out at a temperature of 40 to 70° C. The man skilled in the art knows how to select the most suitable temperature depending on the Mg compound and alcohol(s) used.

The transition metal (TM) compound of Group 4 to 6 as defined in IUPAC version 2013 is preferably a titanium compound, most preferably a titanium halide, like $TiCl_4$.

The non-phthalic internal donor (ID) used in the preparation of the specific type of Ziegler-Natta catalyst used in the present invention is preferably selected from (di)esters of non-phthalic carboxylic (di)acids, 1,3-diethers, derivatives and mixtures thereof. An especially preferred donor is a diester of mono-unsaturated non-phthalic dicarboxylic acids, in particular an ester belonging to a group comprising malonates, maleates, succinates, citraconates, glutarates, cyclohexene-1,2-dicarboxylates and benzoates and derivatives thereof and/or mixtures thereof. Preferred examples are e.g. substituted maleates and citraconates, most preferably citraconates.

Here and hereinafter the term derivative includes substituted compounds.

In the emulsion-solidification method, the two phase liquid-liquid system may be formed by simple stirring and optionally adding (further) solvent(s) and/or additives, such as a turbulence minimizing agent (TMA) and/or an emulsifying agent and/or an emulsion stabilizer, like a surfactant, which are used in a manner known in the art. These solvents and/or additives are used to facilitate the formation of the emulsion and/or stabilize it. Preferably, surfactants are acrylic or methacrylic polymers. Particularly preferred are unbranched $C_{12}$ to $C_{20}$ (meth)acrylates such as for example poly(hexadecyl)-methacrylate and poly(octadecyl)-methacrylate and mixtures thereof. The turbulence minimizing agent (TMA), if used, is preferably selected from polymers of α-olefin monomers with 6 to 20 carbon atoms, like polyoctene, polynonene, polydecene, polyundecene or polydodecene or mixtures thereof. Most preferable it is polydecene.

The solid particulate product obtained by the precipitation or emulsion—solidification method may be washed at least once, preferably at least twice, most preferably at least three times. The washing can take place with an aromatic and/or aliphatic hydrocarbon, preferably with toluene, heptane or pentane. Washing is also possible with $TiCl_4$ optionally combined with the aromatic and/or aliphatic hydrocarbon. Washing liquids can also contain donors and/or compounds of Group 13, like trialkyl aluminium, halogenated alkyl aluminium compounds or alkoxy aluminium compounds. Aluminium compounds can also be added during the catalyst synthesis. The catalyst can further be dried, for example by evaporation or flushing with nitrogen or it can be slurried to an oily liquid without any drying step.

The finally obtained specific type of Ziegler-Natta catalyst is desirably obtained in the form of particles having generally an average particle size range of 5 to 200 µm, preferably 10 to 100 µm. The particles are generally compact with low porosity and have generally a surface area below 20 g/m², more preferably below 10 g/m². Typically, the amount of Ti present in the catalyst is in the range of 1 to 6 wt %, the amount of Mg is in the range of 10 to 20 wt % and the amount of internal donor present in the catalyst is in the range of 10 to 40 wt % of the catalyst composition. A detailed description of the preparation of the catalysts used in the present invention is disclosed in WO2012/007430, EP2610271 and EP2610272 which are incorporated here by reference.

An external donor (ED) is preferably present as a further component in the polymerization process according to the invention. Suitable external donors (ED) include certain silanes, ethers, esters, amines, ketones, heterocyclic compounds and blends of these. It is especially preferred to use a silane. It is most preferred to use silanes of the general formula (I)

$$R^a_p R^b_q Si(OR^c)_{(4-p-q)} \quad (I)$$

wherein $R^a$, $R^b$ and $R^c$ denote a hydrocarbon radical, in particular an alkyl or cycloalkyl group, and wherein p and q are numbers ranging from 0 to 3 with their sum (p+q) being equal to or less than 3. $R^a$, $R^b$ and $R^c$ can be chosen independently from one another and can be the same or different. Specific examples of silanes according to formula (I) are (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$. Another most preferred silane is according to the general formula (II)

$$Si(OCH_2CH_3)_3(NR^3R^4) \quad (II)$$

wherein $R^3$ and $R^4$ can be the same or different and represent a linear, branched or cyclic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl. Most preferably ethyl is used.

Generally, in addition to the Ziegler-Natta catalyst or the specific type of Ziegler-Natta catalyst and the optional external donor (ED) a co-catalyst (Co) can be present in the polymerization process according to the invention. The co-catalyst is preferably a compound of group 13 of the periodic table (IUPAC, version 2013), such as for example an aluminum compound, e.g., an organo aluminum or aluminum halide compound. An example of a suitable organo aluminium compound is an aluminum alkyl or aluminum alkyl halide compound. Accordingly, in one specific embodiment the co-catalyst (Co) is a trialkylaluminium, like triethylaluminium (TEAL), dialkyl aluminium chloride or alkyl aluminium dichloride or mixtures thereof. In one specific embodiment the co-catalyst (Co) is triethylaluminium (TEAL).

Generally, the molar ratio between the co-catalyst (Co) and the external donor (ED) [Co/ED] and/or the molar ratio between the co-catalyst (Co) and the transition metal (TM) [Co/TM] is carefully chosen for each process. The molar ratio between the co-catalyst (Co) and the external donor (ED), [Co/ED] can suitably be in the range of 2.5 to 50.0 mol/mol, preferably in the range of 4.0 to 35.0 mol/mol, more preferably in the range of 5.0 to 30.0 mol/mol. A suitable lower limit can be 2.5 mol/mol, preferably 4.0 mol/mol, more preferably 5.0 mol/mol. A suitable upper limit can be 50.0 mol/mol, preferably 35.0 mol/mol, more preferably 30.0 mol/mol. The lower and upper indicated values of the ranges are included.

The molar ratio between the co-catalyst (Co) and the transition metal (TM), [Co/TM] can suitably be in the range of 20.0 to 500.0 mol/mol, preferably in the range of 50.0 to 400.0 mol/mol, more preferably in the range of 100.0 to 300.0 mol/mol. A suitable lower limit can be 20.0 mol/mol, preferably 50.0 mol/mol, more preferably 100.0 mol/mol. A suitable upper limit can be 500.0 mol/mol, preferably 400.0 mol/mol, more preferably 300.0 mol/mol. The lower and upper indicated values of the ranges are included.

According to the present invention, the third propylene polymer fraction recovered from the polymerization process is extruded in the presence of at least one alpha-nucleating agent in order to produce the inventive polypropylene composition.

The extruder, where the extrusion step is carried out, may be any extruder known in the art. The extruder may thus be a single screw extruder; a twin screw extruder, such as a co-rotating twin screw extruder or a counter-rotating twin screw extruder; or a multi-screw extruder, such as a ring extruder. Preferably the extruder is a single screw extruder or a twin screw extruder. Especially preferred extruder is a co-rotating twin screw extruder.

The extruder typically comprises a feed zone, a melting zone, a mixing zone and optionally a die zone.

The extruder typically has a length over diameter ratio, L/D, of up to 60:1, preferably of up to 40:1.

The extruder may also have one or more feed ports for introducing further components, such as for example additives, into the extruder. The location of such additional feed ports depends on the type of material added through the port.

Examples of additives include, but are not limited to, stabilizers such as antioxidants (for example sterically hindered phenols, phosphites/phosphonites, sulphur containing antioxidants, alkyl radical scavengers, aromatic amines, hindered amine stabilizers, or blends thereof), metal deactivators (for example Irganox® MD 1024), or UV stabilizers (for example hindered amine light stabilizers). Other typical additives are modifiers such as antistatic or antifogging agents (for example ethoxylated amines and amides or glycerol esters), acid scavengers (for example Ca-stearate), blowing agents, cling agents (for example polyisobutene), lubricants and resins (for example ionomer waxes, polyethylene- and ethylene copolymer waxes, Fischer Tropsch waxes, montan-based waxes, fluoro-based compounds, or paraffin waxes), as well as slip and antiblocking agents (for example erucamide, oleamide, talc, natural silica and synthetic silica or zeolites) and mixtures thereof.

Generally, the total amount of additives introduced into the extruder during the process according to the present invention, is not more than 5.0 wt %, preferably not more than 2.0 wt %, more preferably not more than 1.5 wt %. The amount of additives is relative to the total amount of polypropylene composition introduced into the extruder.

In the process according to the invention, the third propylene polymer fraction is extruded at a temperature which is higher than the melting temperature of the third propylene polymer fraction but lower than the decomposition temperature of the third propylene polymer fraction. Suitably, the third propylene polymer fraction is extruded at a temperature at least 30° C. higher than the melting temperature of the third propylene polymer fraction, preferably the third propylene polymer fraction is extruded at a temperature at least 40° C. higher than the melting temperature of the third propylene polymer fraction, more preferably the third propylene polymer fraction is extruded at a temperature at least 50° C. higher than the melting temperature of the third propylene polymer fraction, but lower than the decomposition temperature of the third propylene polymer fraction, i.e. lower than 300° C.

In the process according to the invention, the third propylene polymer fraction is extruded in the presence of an amount of at the least one alpha-nucleating agent in the range of from 0.01 to 1.0 wt %, preferably in the range of from 0.03 to 0.9 wt %, more preferably in the range of from 0.05 to 0.8 wt %. The amount of the at least one alpha-nucleating agent is relative to the total amount of polypropylene composition according to the invention.

The α-nucleating agent is generally selected from the group consisting of:
(i) salts of monocarboxylic acids and polycarboxylic acids, e.g. sodium benzoate or aluminum tert-butylbenzoate,
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol,
(iii) salts of diesters of phosphoric acid, e.g. sodium 2,2'-methylenebis (4,6,-di-tert-butylphenyl) phosphate or aluminium-hydroxy-bis[2,2'-methylene-bis(4,6-di-t-butylphenyl)phosphate],
(iv) vinylcycloalkane polymer and vinylalkane polymer, and
(v) mixtures thereof.

Preferably, the α-nucleating agent is a dibenzylidenesorbitol (e.g. 1,3:2,4 dibenzylidenesorbitol) or a $C_1$-$C_8$-alkyl-substituted dibenzylidenesorbitol derivative, such as methyldibenzylidenesorbitol, ethyldibenzylidenesorbitol or dimethyldibenzylidenesorbitol (e.g. 1,3:2,4 di(methylbenzylidene) sorbitol) or a substituted nonitol-derivative, such as 1,2,3,-trideoxy-4,6:5,7-bis-O-[(4-propylphenyl) methylene]-nonitol.

The at least one alpha-nucleating agent is generally fed into the extruder via the feed zone. However, the at least one alpha-nucleating agent may be fed into the extruder via the one or more feed ports comprised in the extruder, e.g., via a side feeder.

At the end of the extruder, a polypropylene composition melt is obtained. The inventive polypropylene composition melt might then be passed through a die in the optional die zone of the extruder. When the inventive polypropylene composition melt is passed through the die it is generally further cooled down and pelletized.

The die zone typically comprises a die plate, which is generally a thick metal disk having multiple holes. The holes are parallel to the screw axis.

The pelletizer is generally a strand pelletizer or an underwater pelletizer.

The invention also provides a polypropylene composition obtainable, preferably obtained, by the process according to the invention.

The polypropylene composition obtainable, preferably obtained, by the process according to the invention generally has one or more comonomers selected from ethylene and $C_4$-$C_{10}$ alpha-olefins, preferably selected from ethylene and $C_4$-$C_8$ alpha-olefins, more preferably selected from ethylene and $C_4$-$C_6$ alpha-olefins, even more preferably selected from one or more comonomers comprising ethylene, further even more preferably the comonomer is selected from solely ethylene.

The polypropylene composition obtainable, preferably obtained by the process according to the invention generally has a comonomer content in the range of from 1.5 to 5.0 wt %, preferably in the range of from 1.6 to 4.0 wt %, more preferably in the range of from 1.7 to 3.5 mol %. The comonomer content is relative to the total amount of monomers present in the polypropylene composition.

Generally, the polypropylene composition obtainable, preferably obtained, by the process according to the invention has a melt flow rate ($MFR_2$) in the range of from 12 to 60 g/10 min, preferably in the range of from 15 to 40 g/10 min, more preferably in the range of from 17 to 35 g/10 min. The $MFR_2$ is determined according to ISO 1133, at a temperature of 230° C. and under a load of 2.16 kg.

Generally, the polypropylene composition obtainable, preferably obtained, by the process according to the invention has a haze value <20%, preferably of from 2% to 18%, more preferably of from 3% to 17%. The haze value is measured according to ASTM D1003 on injection moulded plaques having 1 mm thickness produced as described in EN ISO 1873-2.

Generally, the polypropylene composition obtainable, preferably obtained, by the process according to the invention has a melting temperature >152° C., preferably in the range of from 153 to 163° C., more preferably in the range of 154 to 162° C. The melting temperature (Tm) is measured by DSC according to ISO 11357/3.

Generally, the polypropylene composition obtainable, preferably obtained, by the process according to the invention has a crystallization temperature >120° C., preferably in the range of from 122 to 132° C., more preferably in the range of 123 to 130° C. The melting temperature (Tc) is measured by DSC according to ISO 11357/3.

Generally, the polypropylene composition obtainable, preferably obtained, by the process according to the invention has a xylene soluble content (XCS) in the range of 5.5 to 18.0 wt %, preferably in the range of from 6.0 to 16.0 wt %, more preferably in the range of from 6.2 to 15.0 wt %. The xylene soluble fraction is determined according to ISO 16152 at 25° C.

Generally, the polypropylene composition obtainable, preferably obtained, by the process according to the invention has a tensile modulus >950 MPa, preferably in the range of from 951 to 1600 MPa, more preferably in the range of from 1000 to 1600 MPa, even more preferably in the range of from 1050 to 1550 MPa. The tensile modulus is measured according to ISO 527-1:2012/ISO 527-2:2012 at 23° C. on injection moulded test specimens.

Generally, the polypropylene composition obtainable, preferably obtained, by the process according to the invention has a Charpy notched impact strength >4.8 kJ/m$^2$, preferably in the range of from 4.9 to 20.0 kJ/m$^2$, more preferably in the range of from 5.0 to 15.0 kJ/m$^2$, even more preferably in the range of from 5.0 to 13.0 kJ/m$^2$, even further more preferably in the range of from 7.0 to 13 kJ/m$^2$. The Charpy notched impact strength is measured according to ISO 179/1eA at 23° C. on injection moulded test specimens as described in EN ISO 1873-2.

The present invention also provides an article comprising the polypropylene composition obtainable, preferably obtained, by the process according to the invention. Suitable articles are films, like for example cast films, and injection moulded articles. A preferred article is a closure cap, a screw cap or a closure system for food or fluid packaging.

Finally, the present invention relates to the use of the polypropylene composition obtainable, preferably obtained by the process according to the invention in the preparation of a cast film or an injection moulded article, preferably a closure cap, a screw cap or a closure system for food or fluid packaging. A fluid is commonly defined as a substance that continually deforms(flows) under an applied shear stress.

EXAMPLES

I. Measuring Methods a) Melt Flow Rate

The melt flow rate (MFR) is determined according to ISO 1133 and is indicated in g/10 min. The MFR is an indication of the flowability and hence the processability of the polymer. The higher the melt flow rate, the lower the viscosity of the polymer. The $MFR_2$ of polypropylene is determined at a temperature of 230° C. and under a load of 2.16 kg.

b) DSC Analysis

The melting temperature and the crystallisation temperature are measured with a TA Instrument Q2000 differential scanning calorimetry device (DSC) according to ISO 11357/3 on 5 to 10 mg samples, under 50 mL/min of nitrogen atmosphere. Crystallisation and melting temperatures were obtained in a heat/cool/heat cycle with a scan rate of 10° C./min between 30° C. and 225° C. Crystallisation and melting temperatures were taken as the peaks of the endotherms and exotherms in the cooling step and the second heating step respectively.

c) Xylene Soluble Content (XCS, Wt %)

The content of the polymer soluble in xylene is determined according to ISO 16152; 5$^{th}$ edition; 2005-07-01 at 25° C.

d) Tensile Modulus

Tensile Modulus is measured according to ISO 527-1:2012/ISO527-2:2012 at 23° C. and at a cross head speed=50 mm/min; using injection moulded test specimens as described in EN ISO 1873-2 (dog bone shape, 4 mm thickness).

e) Charpy Notched Impact

Charpy notched impact strength is determined according to ISO 179/1eA at 23° C. on injection moulded test specimens as described in EN ISO 1873-2 (80×10×4 mm).

f) Haze

Haze is determined according to ASTM D1003 on injection moulded plaques having 1 mm thickness and 60×60 mm$^2$ area produced as described in EN ISO 1873-2.

g) Comonomer Content

Poly(Propylene-Co-Ethylene)-Ethylene Content by IR Spectroscopy

Quantitative infrared (IR) spectroscopy was used to quantify the ethylene content of the poly(ethylene-co-propene) copolymers through calibration to a primary method.

Calibration was facilitated through the use of a set of in-house non-commercial calibration standards of known ethylene contents determined by quantitative $^{13}$C solution-state nuclear magnetic resonance (NMR) spectroscopy. The calibration procedure was undertaken in the conventional manner well documented in the literature. The calibration set consisted of 38 calibration standards with ethylene contents ranging 0.2-75.0 wt % produced at either pilot or full scale under a variety of conditions. The calibration set was selected to reflect the typical variety of copolymers encountered by the final quantitative IR spectroscopy method.

Quantitative IR spectra were recorded in the solid-state using a Bruker Vertex 70 FTIR spectrometer. Spectra were recorded on 25×25 mm square films of 300 um thickness prepared by compression moulding at 180-210° C. and 4-6 mPa. For samples with very high ethylene contents (>50 mol %) 100 um thick films were used. Standard transmission FTIR spectroscopy was employed using a spectral range of 5000-500 cm$^{-1}$, an aperture of 6 mm, a spectral resolution of 2 cm$^{-1}$, 16 background scans, 16 spectrum scans, an interferogram zero filling factor of 64 and Blackmann-Harris 3-term apodisation. Quantitative analysis was undertaken using the total area of the CH$_2$ rocking deformations at 730 and 720 cm$^{-1}$ ($A_Q$) corresponding to (CH$_2$)$_{>2}$ structural units (integration method G, limits 762 and 694 cm$^{-1}$). The quantitative band was normalised to the area of the CH band at 4323 cm$^{-1}$ ($A_R$) corresponding to CH structural units (integration method G, limits 4650, 4007 cm$^{-1}$). The ethylene content in units of weight percent was then predicted from the normalised absorption ($A_Q/A_R$) using a quadratic calibration curve. The calibration curve having previously been constructed by ordinary least squares (OLS) regression of the normalised absorptions and primary comonomer contents measured on the calibration set.

Poly(Propylene-Co-Ethylene)-Ethylene Content for Calibration Using $^{13}$C NMR Spectroscopy Quantitative $^{13}$C{$^1$H} NMR spectra were recorded in the solution-state using a Bruker Avance III 400 NMR spectrometer operating at 400.15 and 100.62 MHz for $^1$H and $^{13}$C respectively. All spectra were recorded using a $^{13}$C optimised 10 mm extended temperature probehead at 125° C. using nitrogen gas for all pneumatics. Approximately 200 mg of material was dissolved in 3 ml of 1,2-tetrachloroethane-d$_2$ (TCE-d$_2$) along with chromium (III) acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225, Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra. Quantitative $^{13}$C{$^1$H} NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed (Cheng, H. N., Macromolecules 17 (1984), 1950) and the comonomer fraction calculated as the fraction of ethylene in the polymer with respect to all monomer in the polymer: fE=(E/(P+E) The comonomer fraction was quantified using the method of Wang et. al. (Wang, W-J., Zhu, S., Macromolecules 33 (2000), 1157) through integration of multiple signals across the whole spectral region in the $^{13}$C{$^1$H} spectra. This method was chosen for its robust nature and ability to account for the presence of regio-defects when needed. Integral regions were slightly adjusted to increase applicability across the whole range of encountered comonomer contents. For systems with very low ethylene content where only isolated ethylene in PPEPP sequences were observed the method of Wang et. al. was modified reducing the influence of integration of sites that are no longer present. This approach reduced the overestimation of ethylene content for such systems and was achieved by reduction of the number of sites used to determine the absolute ethylene content to E=0.5(Sββ+Sβγ+Sβδ+0.5(sαβ+Sαγ)) Through the use of this set of sites the corresponding integral equation becomes E=0.5($I_H$+$I_G$+0.5($I_C$+$I_D$)) using the same notation used in the article of Wang et. al. (Wang, W-J., Zhu, S., Macromolecules 33 (2000), 1157). Equations used for absolute propylene content were not modified. The mole percent comonomer incorporation was calculated from the mole fraction: E [mol %]=100*fE. The weight percent comonomer incorporation was calculated from the mole fraction: E [wt %]=100*(fE*28.06)/((fE*28.06)+((1−fE)*42.08)).

II. Inventive and Comparative Examples a) Catalyst Preparation

For the preparation of the catalyst 3.4 litre of 2-ethylhexanol and 810 ml of propylene glycol butyl monoether (in a molar ratio 4/1) were added to a 20.0 l reactor. Then 7.8 litre of a 20.0% solution in toluene of BEM (butyl ethyl magnesium) provided by Crompton GmbH, were slowly added to the well stirred alcohol mixture. During the addition, the temperature was kept at 10.0° C. After addition, the temperature of the reaction mixture was raised to 60.0° C. and mixing was continued at this temperature for 30 minutes. Finally after cooling to room temperature the obtained Mg-alkoxide was transferred to a storage vessel.

21.2 g of Mg alkoxide prepared above was mixed with 4.0 ml bis(2-ethylhexyl) citraconate for 5 min. After mixing the obtained Mg complex was used immediately in the preparation of the catalyst component.

19.5 ml of titanium tetrachloride was placed in a 300 ml reactor equipped with a mechanical stirrer at 25.0° C. Mixing speed was adjusted to 170 rpm. 26.0 g of Mg-complex prepared above was added within 30 minutes keeping the temperature at 25.0° C. 3.0 ml of Viscoplex® 1-254 and 1.0 ml of a toluene solution with 2 mg Necadd 447™ was added. Then 24.0 ml of heptane was added to form an emulsion. Mixing was continued for 30 minutes at 25.0° C., after which the reactor temperature was raised to 90.0° C. within 30 minutes. The reaction mixture was stirred for a further 30 minutes at 90.0° C. Afterwards stirring was stopped and the reaction mixture was allowed to settle for 15 minutes at 90.0° C. The solid material was washed 5 times: washings were made at 80.0° C. under stirring for 30 min with 170 rpm. After stirring was stopped the reaction mixture was allowed to settle for 20-30 minutes and followed by siphoning.

Wash 1: washing was made with a mixture of 100 ml of toluene and 1 ml donor

Wash 2: washing was made with a mixture of 30 ml of TiCl4 and 1 ml of donor.

Wash 3: washing was made with 100 ml of toluene.

Wash 4: washing was made with 60 ml of heptane.

Wash 5: washing was made with 60 ml of heptane under 10 minutes stirring.

Afterwards stirring was stopped and the reaction mixture was allowed to settle for 10 minutes while decreasing the temperature to 70° C. with subsequent siphoning, followed by $N_2$ sparging for 20 minutes to yield an air sensitive powder.

b) Inventive Examples (IE1 and IE2)

The third propylene polymer fractions related to the inventive examples (IE) were produced in a pilot plant with a prepolymerization reactor, one slurry loop reactor and two gas phase reactors. The solid catalyst component described above along with triethyl-aluminium (TEAL) as co-catalyst and dicyclo pentyl dimethoxy silane (D-donor) as external donor, were used in the inventive process.

The polymerization process conditions and properties of the propylene polymer fraction are described in Table 1.

The inventive polypropylene compositions were prepared by extruding the respective third propylene polymer fraction with a nucleating agent in a co-rotating twin screw extruder type Coperion ZSK 40 (screw diameter 40 mm, L/D ratio 38). The temperatures in the extruder were in the range of 190-230° C. In each of the inventive examples 0.05 wt % of Irganox 1010 (Pentaerythrityl-tetrakis(3-(3',5'-di-tert. butyl-4-hydroxyphenyl)-propionate, CAS No. 6683-19-8, commercially available from BASF AG, Germany), 0.05 wt % of Irgafos 168 (Tris (2,4-di-t-butylphenyl) phosphite, CAS No. 31570-04-4, commercially available from BASF AG, Germany), 0.10 wt % of Calcium stearate (CAS. No. 1592-23-0, commercially available under the trade name Ceasit F1 from Baerlocher GmbH, Germany) and 0.06 wt % of Glycerol monostearate (CAS No. 97593-29-8, commercially available with 90% purity under the trade name Grindsted PS 426 from Danisco NS, Denmark) were added to the extruder as additives.

Following the extrusion step and after solidification of the strands in a water bath, the resulting polypropylene composition was pelletized in a strand pelletizer.

The polypropylene composition properties are described in Table 2.

c) Comparative Examples (CE1 and CE2)

CE-1 is a $C_2$ propylene random copolymer having an $MFR_2$ of 13.0 g/10 min, produced in one reactor process and distributed by Borealis under the Trade name RE420MO.

CE-2 is a $C_2$ propylene random copolymer having an $MFR_2$ of 20.0 g/10 min, produced in one reactor process and distributed by Borealis under the Trade name RF365MO.

TABLE 1

Polymerization process conditions and propylene polymer fractions properties

|  |  | IE1 | IE2 |
|---|---|---|---|
| Pre-polymerization reactor | | | |
| Temperature | [° C.] | 30 | 30 |
| Catalyst feed | [g/h] | 2.5 | 2.6 |
| D-Donor | [g/t propylene] | 41 | 41 |
| TEAL/propylene | [g/t propylene] | 170 | 170 |
| Al/D-Donor [Co/ED] | [mol/mol] | 8.3 | 8.2 |
| Al/Ti [Co/TM] | [mol/mol] | 217 | 211 |
| Residence Time | [h] | 0.3 | 0.3 |
| Loop reactor (first propylene polymer fraction) | | | |
| Temperature | [° C.] | 70 | 70 |
| Pressure | [kPa] | 5270 | 5270 |
| Residence time | [h] | 0.4 | 0.4 |
| Split | [%] | 47 | 36 |
| $H_2/C_3$ ratio | [mol/kmol] | 2.4 | 2.3 |
| $C_2/C_3$ ratio | [mol/kmol] | 3.6 | 3.6 |
| $MFR_2$ | [g/10 min] | 24.8 | 21.9 |
| $C_2$ content | [wt %] | 0.5 | 0.4 |
| First gas-phase reactor (second propylene polymer fraction) | | | |
| Temperature | [° C.] | 80 | 80 |
| Pressure | [kPa] | 2400 | 2400 |
| Residence time | [h] | 1.4 | 1.4 |
| Split | [%] | 38 | 48 |
| $H_2/C_3$ ratio | [mol/kmol] | 28.7 | 27.2 |
| $C_2/C_3$ ratio | [mol/kmol] | 9.2 | 9.1 |
| $MFR_2$ | [g/10 min] | 22.4 | 19.0 |
| $C_2$ content | [wt %] | 0.98 | 0.93 |
| Second gas-phase reactor (third propylene polymer fraction) | | | |
| Temperature | [° C.] | 80 | 80 |
| Pressure | [kPa] | 2350 | 2350 |
| Residence time | [h] | 0.9 | 0.9 |
| Split | [%] | 15 | 16 |
| $H_2/C_3$ ratio | [mol/kmol] | 36.9 | 45.4 |
| $C_2/C_3$ ratio | [mol/kmol] | 69.3 | 71.2 |
| $MFR_2$ | [g/10 min] | 19.0 | 18.4 |
| $C_2$ content | [wt %] | 2.6 | 3.0 |

*Split relates to the amount of propylene polymer produced in each specific reactor.

TABLE 2

Extrusion process conditions and polypropylene composition properties.

|  |  | IE1 | IE2 | CE1 | CE2 |
|---|---|---|---|---|---|
| Nucleating agent (Millad 3988 ®) | wt % | 0.17 | 0.17 | 0.0 | 0.0 |
| Composition properties* | | | | | |
| $MFR_2$ | [g/10 min] | 19.0 | 18.0 | 13 | 20 |
| $C_2$ content | [wt %] | 2.6 | 2.9 | 3.4 | 3.4 |
| XCS | [wt %] | 6.9 | 8.6 | 5.8 | 6.8 |
| Tensile Modulus | [MPa] | 1305 | 1240 | 921 | 1138 |
| Charpy notched impact strength | [kJ/m²] | 5.5 | 7.22 | 5.3 | 4.5 |
| Haze (1 mm) | [%] | 17 | 15 | 23 | 20 |
| Tm | [° C.] | 160 | 159 | 150 | 151 |
| Tc | [° C.] | 128 | 128 | 120 | 120 |

*measured on pellets obtained after the extrusion process.

From Table 2 it can be derived that the polypropylene compositions (inventive examples) show an improved balanced combination of high flowability, high stiffness and impact, and high level of optical properties (low haze value), compared to the comparative examples.

The invention claimed is:

1. A process for producing a polypropylene composition by sequential polymerization comprising the steps:
   a) polymerizing in a first reactor monomers comprising propylene and optionally one or more comonomers selected from ethylene and $C_4$-$C_{10}$ alpha-olefins, to obtain a first propylene polymer fraction having a comonomer content in the range of 0.0 to 1.0 wt %;
   b) polymerizing in a second reactor monomers comprising propylene and one or more comonomers selected from ethylene and $C_4$-$C_{10}$ alpha-olefins, in the presence of the first propylene polymer fraction, to obtain a second propylene polymer fraction having a comonomer content in the range of 0.3 to 2.0 wt %;
   c) polymerizing in a third reactor monomers comprising propylene and one or more comonomers selected from ethylene and $C_4$-$C_{10}$ alpha-olefins, wherein the ratio of the one or more comonomers to propylene is in the range of 45.0 to 170.0 mol/kmol, in the presence of the second propylene polymer fraction to obtain a third propylene polymer fraction having a comonomer content in the range of from 1.5 to 5.0 wt %; and
   d) extruding the third propylene polymer fraction in the presence of at least one alpha-nucleating agent;
   wherein the polypropylene composition has an $MFR_2$ in the range of from 12.0 to 60.0 g/10 min, as measured according to ISO 1133 at 230° C. under a load of 2.16 kg.

2. The process according to claim 1, wherein the polymerization in steps a), b), and c) is carried out in the presence of a Ziegler-Natta catalyst.

3. The process according to claim 2, wherein the Ziegler-Natta catalyst is free of a phthalic compound.

4. The process according to claim 1, wherein the process is operated in the presence of a Ziegler-Natta catalyst with a transition metal of group 4 to 6 of the periodic table, the catalyst comprising an internal donor, wherein the internal donor is a non-phthalic internal donor.

5. The process according to claim 4, wherein the non-phthalic internal donor is selected from (di)esters of non-phthalic carboxylic (di)acids, wherein the (di)ester belongs to the group consisting of malonates, maleates, succinates, citraconates, glutarates, cyclohexene-1,2-dicarboxylates, benzoates, derivatives thereof, and mixtures thereof.

6. The process according to claim 4, wherein the catalyst further comprises a co-catalyst, an external donor, or a combination thereof.

7. The process according to claim 1, wherein the comonomers in step a), step b), step c), or a combination thereof are selected from one or more comonomers comprising ethylene.

8. The process according to claim 1, wherein:
   a) the hydrogen/propylene ($H_2/C_3$) ratio in the first reactor is in the range of 1.5 to 6.0 mol/kmol;
   b) the hydrogen/propylene ($H_2/C_3$) ratio in the second reactor is in the range of 12.0 to 70.0 mol/kmol; and
   c) the hydrogen/propylene ($H_2/C_3$) ratio in the third reactor is in the range of 15.0 to 80.0 mol/kmol.

9. The process according to claim 1, wherein the third propylene polymer fraction is extruded in the presence of an amount of the at least one alpha-nucleating agent in the range of from 0.01 to 1.0 wt %, relative to the total amount of polypropylene composition.

10. The process according to claim 1, wherein the polypropylene composition has a haze value <20%, as measured according to ASTM D1003 on injection molded plaques having 1 mm thickness produced as described in EN ISO 1873-2.

11. The process according to claim 1, wherein the first reactor comprises a slurry reactor.

12. The process according to claim 1, wherein the second reactor comprises a gas phase reactor.

13. The process according to claim 1, wherein the third reactor comprises a gas phase reactor.

* * * * *